United States Patent
Orciuoli et al.

(10) Patent No.: US 12,073,171 B2
(45) Date of Patent: Aug. 27, 2024

(54) SYSTEM AND METHOD FOR EXTRACTING WEBSITE CHARACTERISTICS

(71) Applicant: Oracle International Corporation, Redwood Shores, CA (US)

(72) Inventors: Anthony Christopher Orciuoli, Redwood City, CA (US); Jacob Kuramoto, Portland, OR (US); Mark Vilrokx, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 116 days.

(21) Appl. No.: 17/205,166

(22) Filed: Mar. 18, 2021

(65) Prior Publication Data

US 2021/0200931 A1    Jul. 1, 2021

Related U.S. Application Data

(63) Continuation of application No. 15/969,532, filed on May 2, 2018, now Pat. No. 10,984,166.
(Continued)

(51) Int. Cl.
*G06F 40/103*    (2020.01)
*G06F 16/957*    (2019.01)
(Continued)

(52) U.S. Cl.
CPC .......... *G06F 40/103* (2020.01); *G06F 16/957* (2019.01); *G06F 16/958* (2019.01); *G06T 11/001* (2013.01); *H04L 67/02* (2013.01)

(58) Field of Classification Search
CPC .......... G06F 16/30; G06F 16/20; G06F 40/00; G06F 3/048; G06F 40/103; G06F 16/958;
(Continued)

(56) References Cited

U.S. PATENT DOCUMENTS 6,954,901 B1    10/2005    Desai et al.
9,100,697 B1    8/2015    Lee
(Continued)

FOREIGN PATENT DOCUMENTS

CN    1606726 A    4/2005
CN    101046820 A    10/2007
(Continued)

OTHER PUBLICATIONS

Li et al., "Research on Content Extraction in Web Pages Based Multi-features", Oct. 15, 2007, pp. 7 (English abstract available).
(Continued)

*Primary Examiner* — Sanchita Roy
(74) *Attorney, Agent, or Firm* — Invoke

(57) ABSTRACT

Some embodiments determine characteristics related to a theme or branding of an existing website. Characteristics from an existing website may, for example, facilitate theming or branding of a new website or software product to coordinate with the existing website. A characteristic extraction system may optimize an existing webpage based on target characteristics to be extracted from the existing webpage. Optimizing an existing webpage includes manipulating the webpage source code and/or the webpage data to facilitate extraction of the target characteristics. Optimization may result in removal of data or formatting from the existing webpage that is unnecessary for extraction of the target characteristics.

24 Claims, 5 Drawing Sheets

Related U.S. Application Data

(60) Provisional application No. 62/566,082, filed on Sep. 29, 2017.

(51) Int. Cl.
*G06F 16/958* (2019.01)
*G06T 11/00* (2006.01)
*H04L 67/02* (2022.01)

(58) Field of Classification Search
CPC ..... G06F 16/957; G06T 11/001; H04L 67/02; G06Q 30/0641
See application file for complete search history.

(56) References Cited

U.S. PATENT DOCUMENTS

| | | |
|---|---|---|
| 2002/0165881 A1 | 11/2002 | Shelton |
| 2007/0239701 A1 | 10/2007 | Blackman et al. |
| 2009/0019386 A1 | 1/2009 | Sweetland et al. |
| 2009/0100330 A1 | 4/2009 | Chen et al. |
| 2011/0010612 A1 | 1/2011 | Thorpe et al. |
| 2011/0239108 A1 | 9/2011 | Blomquist et al. |
| 2012/0290920 A1 | 11/2012 | Crossley |
| 2013/0311877 A1* | 11/2013 | Ebner ............ G06F 40/143 715/236 |
| 2014/0026037 A1* | 1/2014 | Garb ............ G06F 16/972 715/255 |
| 2014/0136944 A1 | 5/2014 | Harris et al. |
| 2015/0206169 A1 | 7/2015 | Ye et al. |
| 2015/0379014 A1 | 12/2015 | Xu et al. |
| 2016/0048483 A1 | 2/2016 | Baldwin et al. |
| 2016/0048605 A1 | 2/2016 | Baldwin et al. |
| 2016/0292275 A1* | 10/2016 | Talton ............ G06F 16/835 |
| 2017/0103102 A1 | 4/2017 | Alison et al. |
| 2017/0221227 A1 | 8/2017 | Ishikawa et al. |

FOREIGN PATENT DOCUMENTS

| | | |
|---|---|---|
| CN | 102200995 A | 9/2011 |
| CN | 102663126 A | 9/2012 |
| CN | 103049536 A | 4/2013 |
| CN | 106462582 A | 2/2017 |
| CN | 106503212 A | 3/2017 |
| CN | 106980497 A | 7/2017 |
| CN | 107193815 A | 9/2017 |
| JP | 2003-308275 A | 10/2003 |
| WO | 2002/075604 A2 | 9/2002 |
| WO | 2015/172228 A1 | 11/2015 |

OTHER PUBLICATIONS

Ozel S.A., "A genetic algorithm based optimal feature selection for Web page classification", International Symposium on Innovations in Intelligent Systems and Applications, 2011, pp. 1-5.

Shen G., "Chinese Web page feature extraction by optimizing comprehensive heuristic based on GA", vol. 9, No. 4, Aug. 2014, pp. 475-479 (English abstract available).

* cited by examiner

SYSTEM AND METHOD FOR EXTRACTING WEBSITE CHARACTERISTICS

INCORPORATION BY REFERENCE; DISCLAIMER

Each of the following applications are hereby incorporated by reference: application Ser. No. 15/969,532 filed May 2, 2018; application no. 62/566,082 filed Sep. 28, 2017. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to website characteristics. In particular, the present disclosure relates to extracting website characteristics.

BACKGROUND

An organization may purchase off-the-shelf software or software as a service (SaaS) solutions. The organization may prefer to customize the look, appearance, or graphical theme of the software applications rather than use the defaults provided by the software applications when purchased. Such customization may include appropriate placement of the organization's logos and trademarks within the software applications. By customizing the software applications, the software applications can be adapted to reflect the brand of the organization that purchased the software applications rather than the organization that developed or sold the software applications.

An organization may customize a website associated with the organization. The organization may adapt a commercially-sold website template to match the organization's branding. Matching an organization's branding may include using colors, fonts, and logos associated with the organization.

The approaches described in this section are approaches that could be pursued, but not necessarily approaches that have been previously conceived or pursued. Therefore, unless otherwise indicated, one should not assume that any of the approaches described in this section qualify as prior art merely by virtue of being included in this section.

BRIEF DESCRIPTION OF THE DRAWINGS

The embodiments are illustrated by way of example and not by way of limitation in the figures of the accompanying drawings. One should note that references to "an" or "one" embodiment in this disclosure are not necessarily to the same embodiment, and they mean at least one. In the drawings.

DETAILED DESCRIPTION

Figure 1:
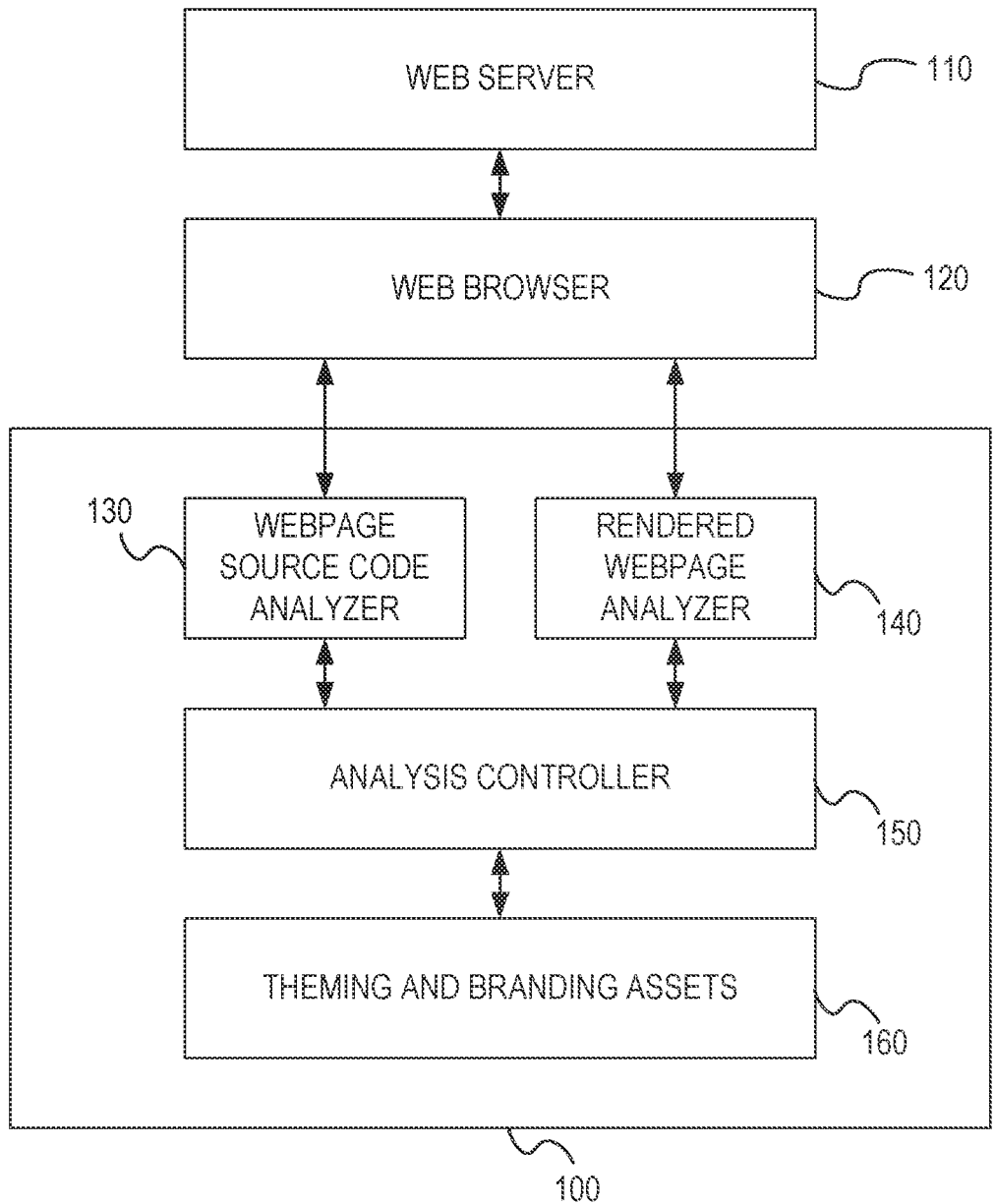
FIG. 1 illustrates a characteristic extraction system for extracting website characteristics in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. General Overview

Some embodiments determine characteristics related to a theme or branding of an existing website. Characteristics from an existing website may, for example, facilitate theming or branding of a new website or software product to coordinate with the existing website. A characteristic extraction system may optimize an existing webpage based on target characteristics to be extracted from the existing webpage. Optimizing an existing webpage includes manipulating the webpage source code and/or the webpage data to facilitate extraction of the target characteristics. Optimization may result in removal of data or formatting from the existing webpage that is unnecessary for extraction of the target characteristics.

This Specification may include, and the claims may recite, some embodiments beyond those that are described in this General Overview section.

2. Architectural Overview

A website may include a single web page or a collection of related web pages, typically identified with a common domain name, and published on at least one web server. A website may be accessible via a public Internet Protocol (IP) network, such as the Internet, or a private local area network (LAN), by referencing a uniform resource locator (URL) that identifies the website. An operation described herein as being performed on or in association with a website may include an operation performed on or in association with a webpage corresponding to the website.

One or more embodiments optimize a webpage to extract website characteristics associated with the webpage. A characteristic extraction system (referred to herein as the "system") may optimize a webpage based on a website characteristic to be extracted from the webpage. As an example, a webpage may be optimized to detect a background color of the webpage. The system may modify the source code of the webpage to set a color for all text to transparent. The system may set an opacity property, in a Cascading Style Sheet (CSS), for all text to '0' (e.g., fully transparent). A rendering of the optimized webpage with transparent text may then be analyzed to determine the background color for the original webpage. Rendering the text as transparent may ensure that the text does not interfere with the analysis of the rendered webpage for determining the background color.

One or more embodiments may detect website characteristics of a rendered webpage by analyzing browser-computed pixel values or screenshots of the rendered webpage. As an example, a characteristic extraction system may determine the color scheme of an organization's logo as rendered on the organization's website. The system may analyze the source code to identify a location of the logo on a webpage of the website. The system may further identify the browser-computed pixel values for the pixels corresponding to the location on the rendered webpage. The system may determine the colors of the logo based on the browser-computed pixel values. The system may also identify a portion of a screenshot of a rendered webpage that corresponds to the location of the logo. The system may analyze the portion of the screenshot to determine the colors of the logo as rendered by a browser.

One or more embodiments may extract website characteristics of a rendered webpage by analyzing the source code of the original webpage in conjunction with analyzing browser-computed pixel values or screenshots of the rendered webpage. As an example, before the source code of the webpage is modified to set a color for text to transparent, the original color of the text may be stored and related with the location of the rendered text on the rendered webpage. When the system determines the background color of the webpage at a certain region of the rendered webpage, the text color that is paired with that background color may be retrieved from the stored information pertaining to the text color at that location. The website characteristic of a text color-background color pairing may then be detected and/or extracted from the combination of the detected website characteristic of the background color and the detected website characteristic of the text color that corresponds to the background color.

FIG. 1 illustrates a characteristic extraction system 100 (referred to herein as system 100) for extracting website characteristics in accordance with one or more embodiments. As illustrated in FIG. 1, the system 100 includes a webpage source code analyzer 130 and a rendered webpage analyzer 140. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In an embodiment, the system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, a user interface refers to hardware and/or software configured to facilitate communications between a user and the system 100. The user interface may render user interface elements and receive input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of the user interface are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the user interface is specified in one or more other languages, such as Java, C, or C++.

In the following description, an embodiment in which the website characteristic is extracted from a website to be applied to a different website or software application is described. However, this should not be construed as limiting, as in various other embodiments, a software application, whether executing on a local client computer system or on a server computer system over a network connection, may be involved and/or operated upon instead of a website.

In one or more embodiments, a webserver 110 is a computer system or an application that processes requests via network protocols to distribute information on the World Wide Web. The primary function of a web server is to store, process and deliver web pages to clients. The communication between client and server takes place using the Hypertext Transfer Protocol (HTTP). Web pages delivered by web servers may include images, style sheets and scripts in addition to text content. A webserver 110 may transmit a webpage, for example, via HTTP over a computer communications network (for example, a local area network (LAN) or the Internet), to a web browser 120.

In one or more embodiments, a web browser 120 (commonly referred to as a browser) is a software application for retrieving, presenting and traversing information resources on the World Wide Web. An information resource is identified by a Uniform Resource Identifier or Uniform Resource Locator (URI/URL) that may be a web page, image, video or other piece of content. Although browsers are primarily intended to use the World Wide Web, browsers can also be used to access information provided by webservers in private networks or files in file systems. In some embodiments, the web browser 120 is be a standalone software application that executes on a client computer communicatively coupled with the webserver 110 over a computer communications network, e.g., a LAN or the Internet. In some embodiments, the web browser 120 is an integral part of the system 100 and specifically configured to perform the operations of the system 100 in coordination with other components of the system 100. For example, as an integral part of the system 100, the web browser 120 may not physically display a rendered webpage, but rather generate a data table in memory or data storage that represents pixels of a rendered webpage to be used for analysis by the system 100. Likewise, a screenshot of the webpage rendered by the web browser 120 may be a stored representation of the rendered webpage generated in the data table in memory or data storage.

The webpage source code analyzer 130 is an application or application component that is configured to optimize webpage source code for analysis and analyze the webpage source code to extract website characteristics. The webpage source code analyzer 130 may analyze the webpage source code both before and after optimizing the webpage source code for analysis. The webpage source code analyzer 130 may use JavaScript code injected into the webpage source code executing within the web browser 120 to perform the optimization of the webpage source code and the analysis of the webpage source code. The webpage source code analyzer 130 may optimize the webpage source code by modifying the webpage source code to be executed by the web browser 120. The webpage source code analyzer 130 may modify the webpage source code via the injected JavaScript to prepare for the analysis and/or as part of the analysis of the webpage.

The rendered webpage analyzer 140 is an application or application component that is configured to detect website characteristics of a rendered webpage. The rendered webpage analyzer 140 may analyze (a) browser-computed pixel values for the webpage as computed by the web browser 120 and/or (b) screenshots of the webpage as rendered by the web browser 120. The rendered webpage analyzer 140 may detect website characteristics of the rendered webpage, e.g., characteristic color schemes such as background colors. The rendered webpage analyzer 140 may perform the analyses of the rendered webpage after the webpage source code is optimized by the webpage source code analyzer 130. For example, after the webpage source code analyzer 130 sets all text to be transparent, the rendered webpage analyzer 140 analyzes the rendered webpage to identify characteristic background colors of the webpage.

The website characteristics detected by the webpage source code analyzer 130 and the website characteristics detected by the rendered webpage analyzer 140 may be combined, for example, as pairings of background colors and text colors in a characteristic color scheme of the webpage.

An analysis controller 150 may coordinate analyses performed by the webpage source code analyzer 130 and rendered webpage analyzer 140 to process, cross-analyze, and collect analysis results. For example, analyses of the rendered webpage to determine various website characteristics such as background color may be more accurate than analysis of the webpage source code alone. Various elements in the webpage source code may be labeled as background color but not actually be displayed as a background color by the web browser 120 because of the impact of cascading style sheets (CSS), for example. In contrast, analysis of the rendered webpage may unambiguously determine a background color of the displayed webpage. Optimizing the source code of the webpage to cause text to be transparent, for example, assists in more accurately determining the background color through analysis of the rendered webpage. While the background color is determined through analysis of the rendered webpage, the text color associated with the background color is determined through analysis of the source code of the webpage, e.g., before the source code is modified to render the text transparent. The analysis controller 150 may output the final analysis results as determined by the combined analyses of the webpage source code analyzer 130 and rendered webpage analyzer 140 to a collection of theming and branding assets 160.

The theming and branding assets 160 may include a collection of website characteristics such as background color, text color and background color pairings, logos, etc. stored in data formats that may be used to theme and brand additional websites or other software applications to correspond with the theming and branding of the website provided by the webserver 110.

The hybrid analysis of the webpage including analyses of the webpage's code and/or values computed based on the webpage's code with the rendered webpage provides increased efficiency and accuracy compared to performing an analysis on only one or the other. For example, a webpage's code may identify one color as a background color, but when the webpage is rendered, the background color may appear to a user as a different color. This may result from the effects of overlapping images or cascading style sheets (CSS), for example. In addition, identifying text colors and corresponding background colors over which the text is displayed from the webpage code and also by analysis of the corresponding rendered webpage may produce more accurate information than either approach alone. For example, the webpage code may identify numerous different colors as background colors, but analyzing the rendered webpage may determine a specific few colors to be background colors. Then, the background colors identified by analyzing the rendered webpage can be matched to the elements within the webpage code to more accurately obtain additional information about the rendered background colors from the matched elements within the webpage code. Also, because of the effects of cascading style sheets, some webpage code may not have a visible effect on the rendered webpage, or the visual effects of the rendered webpage may be the result of a combination of numerous elements in various cascading style sheets that may not be detected through analysis of the webpage code by itself.

Examples of operations performed by the system 100 and its constituent components are given below with reference to FIG. 2.

3. Example Embodiment

Figure 2:
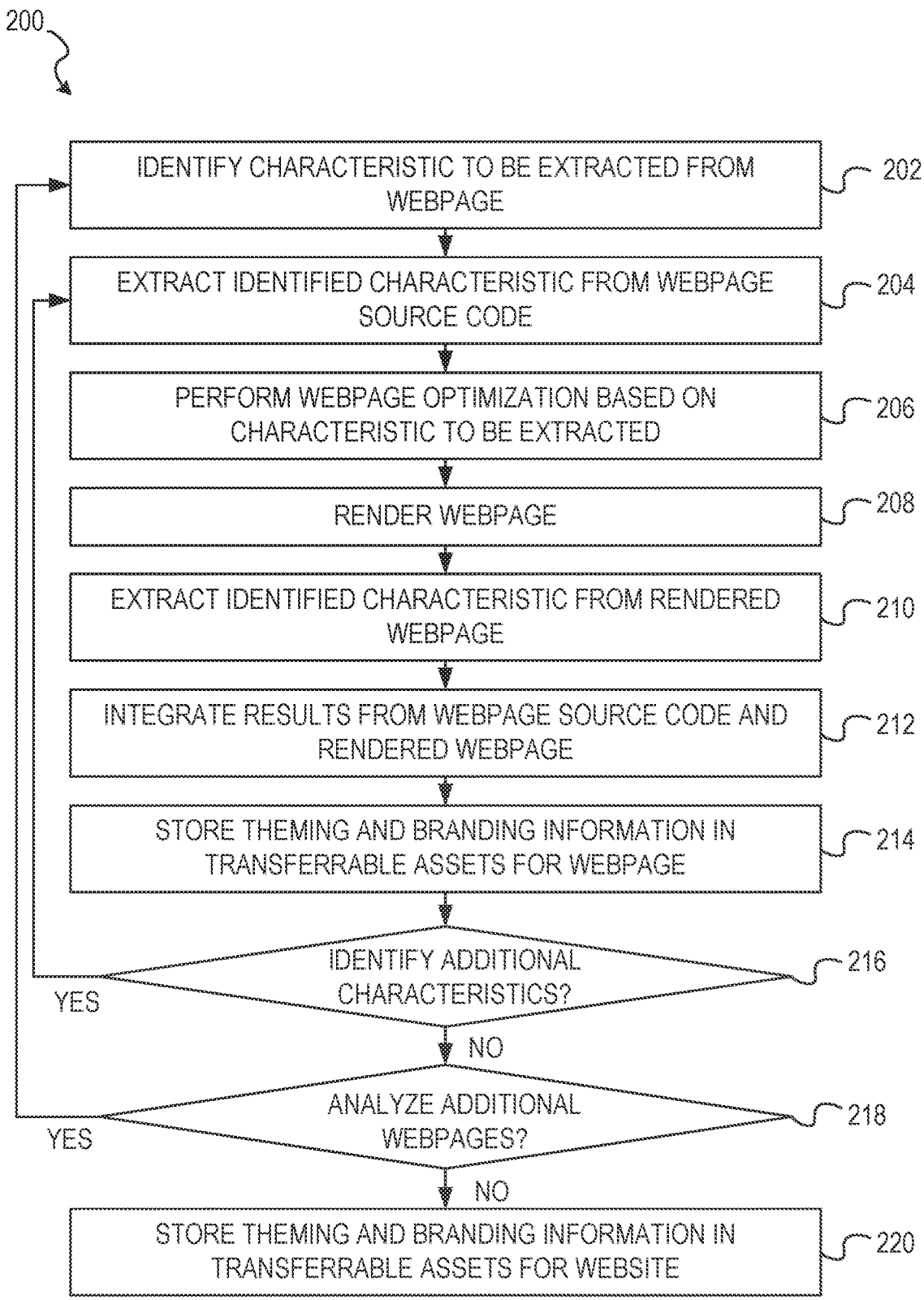
FIG. 2 illustrates an example set of operations for extracting website characteristics in accordance with one or more embodiments.

FIG. 2 illustrates an example set of operations 200 for extracting website characteristics in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments. A detailed example is described below for purposes of clarity. Components and/or operations described below should be understood as one specific example which may not be applicable to certain embodiments. Accordingly, components and/or operations described below should not be construed as limiting the scope of any of the claims.

In various embodiments, a process performed by a system including a computing processor (e.g., the system 100 of FIG. 1) may extract website characteristics from a website or software application, and provide the website characteristics to be applied to a different website or software application. In the following description, embodiments in which the design information is extracted from a website to be applied to a different website or software application is described. However, in various other embodiments, a software application, whether executing on a local client computer system or on a server computer system over a network connection, may be involved and/or operated upon instead of a website. Furthermore, in the embodiments discussed below, focus is given to extracting a logo and colors from a website. Many other theming and branding characteristics (some examples of which are identified below) may be identified and extracted from the website using similar processes.

In an operation 202, a characteristic to be extracted from a webpage may be identified. The identified characteristic may be one that affects the theme or brand of the webpage. The characteristic may be identified by receiving an identification of the characteristic via a user interface, via a data file, via a communication over a computer communications network, or via another process executing on the computing processor on which the system 100 executes. The webpage may be identified via a URL and served by web server 110 of FIG. 1. The characteristic to be extracted from the webpage may include a theme, a logo, branding, and/or the like. The webpage may be accessed by the web browser 120 via the URL. The web browser 120 may load the webpage to execute and render the webpage.

Examples of the characteristic to be extracted include a logo, a background color, and a text color. These examples are described below. Other examples include, but are not limited to, the following:

Text fonts style/size/spacing
    Text size
    Text colors (this information may be obtained before text is set to be transparent)
    Pairings of text colors with background colors over which the text is positioned
    Text highlight colors
    Text field color
    Text spacing (e.g., kerning)
    Text justification
    Paragraph indentation
    Text margins/padding
    Text direction (left-to-right, right-to-left, etc.)
    Bullet point style
    Number of columns and rows
    Line spacing or row heights
    Column widths
    Cursor color
    Cursor look
    Scroll behavior
    Mouseover behavior
    Animation speed/duration/type
    Layout, structure and responsiveness
    Background image repetition
    Border style
    Corner roundness
    Icon style
    Button style (e.g., roundness)
    Image opacity
    Colors, darkness, palette
    Gradients
    Existence of media, sound In an operation 204, the webpage source code analyzer 130 may extract the identified characteristic from the webpage source code by analyzing the webpage source code loaded by the web browser 120. The webpage source code analyzer 130 may inject JavaScript code into the webpage code executed on the web browser 120. The injected JavaScript code may modify and/or execute alongside the webpage's native code downloaded from the web server 110. The JavaScript code may modify the local copy of the webpage's code in the web browser 120 for performing analyses of the webpage. The JavaScript code may be coordinated with the webpage source code analyzer 130 to search, modify, and/or analyze the code of the webpage executed on the web browser 120, e.g., Hyper Text Markup Language (HTML) code, JavaScript code, or other computer executable instructions included in the webpage.

For example, the webpage source code analyzer 130 may identify the color of text used in the webpage. To determine text font colors, the webpage source code may be analyzed and text font colors may be CSS computed to determine their values. When different colors of text are used in the different regions of the webpage, the webpage source code analyzer 130 may identify the color of text used in the different regions of the webpage. The webpage source code analyzer 130 may store a table of text colors used in the webpage keyed by different regions of the webpage. This information may be later used by the system 100 to correlate text colors with background colors of the webpage when determining an overall thematic color scheme for the webpage.

As another example, the injected JavaScript code may search the webpage code to find candidates for the brand logo, e.g., the company logo or website logo. For example, each HTML element in the webpage code may searched by the JavaScript code to find images. When searching for logos, sizes of images may be compared to thresholds to reject images that are too small or too large, and images within a certain size range may be considered as candidates for a logo. For example, images with height greater than 300 pixels (or other unit, in various embodiments) or less than a width of 18 or a height of 11.78 may be rejected as not likely to be a logo. In addition, the location of images in the webpage may be compared to thresholds to reject images that are not in the most likely locations for logos to be placed and only images within a certain range of likely logo locations may be considered as candidates for a logo image. For example, only images that are placed within visible bounds of the webpage may be considered as possible logos, and images outside the visible bounds of the webpage may be rejected as not likely to be logos. As another example, only images that are placed above a certain vertical location of the webpage may be considered as possible logos, and images below the certain vertical location of the webpage (e.g., too far down the visible page) may be rejected as not likely to be logos. The vertical threshold may be considered to be some number of pixels, e.g., 315 pixels from the top of the displayed webpage.

Candidates for the brand logo, e.g., the company logo or website logo, may be assigned points or scores based on one or more of various factors associated with the candidates. For example:

+2.5 points may be assigned the candidate if the word or character string "logo" is included in a field or element attribute associated with the candidate
    +2.5 points for any similarly-sized (e.g., less than twice as tall or high, or simply less than 255 pixels wide) parent node of the element that has an attribute mentioning "logo"
    −5 points if the image element or at least one of its parent elements is a JavaScript link or a link to a host different from the webpage itself
    +1 point if any associated link matches to the webpage's host
    +1 point if any associated link matches an expected home page document name (e.g., index.html, index.htm, index.php, index.jsp, home.html, default.htm, default.aspx)
    −1 point for an inconclusive link analysis
    +1.5 points if image is located less than 100 pixels from a top edge of the webpage
    +1 point if image's left edge is located more than 10 pixels from the right edge of the webpage
    +1 point if the image's left edge is located less than 200 pixels from the left edge of the webpage
    +1 point if the left edge of the image is located less than 18 pixels from the left edge of the webpage
    −1 point if the image's width is over 471 pixels
    −1 point if the image's width is over 711 pixels
    −1 point if any image attribute matches to navigation (e.g., nav, navigat, menu) but is not included in the webpage's URL −5 points if any image attribute or similarly-sized parent node attribute matches to other non-logo text (e.g., hamburger, spacer, shim, search, close, rss, cart, facebook, flickr, google, instagram, linkedin, tumblr, twitter, youtube) but is not included in the webpage's URL Candidates for the brand logo may be sorted according to their accumulated points values determined as described above. Two groups of candidates may be created with priority given to any image elements that have a size and/or location that fits within a predetermined expected range for a logo, do not include any menu or navigation attributes, and/or include an attribute specifically associated with a logo. For example, such a predetermined expected range for a logo may include between 17 and 471 pixels wide, greater than 11 pixels high, less than 219 pixels from a top of the webpage, and an area greater than 323 square pixels.

Additionally, or alternatively, the rendered webpage analyzer 140 may analyze image elements rendered on the webpage starting from a predetermined distance (e.g., 19 pixels) from one side (e.g., the left side) and a predetermined distance (e.g., 19 pixels) from the top to identify candidate logos, skipping a predetermined distance (e.g., 18 pixels) to the other side (e.g., the right) until reaching the middle of the webpage minus a predetermined amount (e.g., 10 pixels), and then continuing to analyze image elements an additional distance from the top (e.g., 18 pixels) until the images being analyzed are less than a final predetermined distance (e.g., 190 pixels) from the top of the webpage.

If no logo candidates are still determined according to the previous operations, all image elements that include mention of the word or character string "logo" may be searched and ranked according to whether the display size of the image element is within the expected logo size range as discussed above and/or whether the image element includes navigation or other menu matches within the image element' attributes.

In some embodiments, when a logo image element is identified but the webpage does not include a link to an image file corresponding to the image element, e.g., for inline SVG images, a location and size of the image element determined by the webpage source code analyzer 130 may be used by the rendered webpage analyzer 140 in conjunction with a screenshot of the displayed webpage (or simulated display of the webpage) to crop the logo from the screenshot and create a new image file including the logo image.

Foreground colors and images as well as background colors and images may be extracted by the webpage source code analyzer 130. Prominent foreground-background color pairs of the webpage may also be determined. A list of foreground-background color pairs may be determined by traversing each text node in the webpage's code with a tree walking algorithm and recording the computed style colors in a list of foreground or background colors. In addition, the webpage source code analyzer 130 may determine and retrieve a background image of the webpage. The webpage code's computed style may be analyzed to identify the background image.

The webpage source code analyzer 130 may perform a prominent colors analysis to identify and create a list of the most common colors used on the webpage. The colors may be identified by a color representation standard, e.g., RGBA. A darkness level may also be associated with each identified color. The colors determined for the foreground-background color pairs may be ranked according to their prevalence on the webpage.

In an operation 206, the webpage source code analyzer 130 may perform webpage optimization based on the characteristic to be extracted. There may be a different optimized webpage created from a same original webpage for each identified webpage characteristic to be extracted. The optimizations may be performed on the webpage to prepare the webpage for analysis by the rendered webpage analyzer 140. The webpage source code analyzer 130 may utilize the JavaScript code injected into the webpage code executed on the web browser 120 to perform the webpage optimization. The injected JavaScript code may modify and/or execute alongside the webpage's native code downloaded from the web server 110.

For example, objects or text displayed on the webpage may be set to be transparent, small images having a size or dimension less than some threshold (e.g., 18 pixels) may be eliminated or hidden, advertisements displayed on the webpage may be eliminated or hidden, and/or any interstitial overlay such as a survey or cookie law popup or the like on the webpage that may interfere with the theme or brand analysis of the webpage or website may be removed or hidden. Opacity of images may be set to hide them from view in the rendered webpage. To assist the rendered webpage analyzer 140 in identifying color characteristics of the rendered webpage, e.g., the most common colors and/or the background colors, all text displayed on the webpage may be set to be transparent in the webpage's code by a tree-walking algorithm. In addition, all images having a width less than some predetermined value (e.g., 420 pixels) or a height less than some predetermined value (e.g., 420 pixels) may be set to be transparent.

In an operation 208, the web browser 120 may render the webpage. Rendering the webpage may include computing values for each pixel of a real-world or virtual video display according to the webpage code. Rendering the webpage may include displaying the webpage on a video display. Alternatively, or additionally, rendering the webpage may include generating a data table in memory or data storage that represents pixels of a rendered webpage to be used for analysis by the system 100. The rendered webpage may include metadata (e.g., links to images displayed on the webpage, links to other webpages accessible from the rendered webpage, etc.) accessible by interacting with the rendered webpage. Thus, the rendered webpage may be interactive. The system 100 may interact with the rendered webpage by simulating mouse movements over the rendered webpage and mouse clicks on the rendered webpage. In this way, images such as logos rendered on the webpage may be identified and stored by a simulated right click of a mouse hovering over a certain region of the webpage. A screenshot of the webpage rendered by the web browser 120 may be created as a stored representation of the rendered webpage generated in the data table in memory or data storage. The screenshot may include all the image information of the rendered webpage on a pixel by pixel basis, but may not include the interactive aspects of the live rendered webpage.

In an operation 210, the rendered webpage analyzer 140 may extract the identified website characteristic from the rendered webpage. The rendered webpage analyzer 140 may analyze the webpage rendered by the web browser 120 in operation 208 while the web browser 120 is presently rendering the webpage. Alternatively, or additionally, the rendered webpage analyzer 140 may analyze a stored screenshot of a previously rendered webpage. The extraction of the website characteristic may include analyzing browser-computed values of pixels according to their relative positions within the rendered webpage. The extraction of the website characteristic may include analyzing browser-computed values of objects accessible via the rendered webpage by a user interface element such as a mouse. The rendered webpage analyzer 140 may simulate user interface elements such as a mouse to access the data provided by the web browser 120 when rendering the webpage. Such data may include image data associated with different regions of the rendered webpage, for example.

In an example, if no logo candidates are determined by the webpage source code analyzer 130 as described above, the rendered webpage analyzer 140 may analyze image elements rendered on the webpage starting from a predetermined distance (e.g., 19 pixels) from one side (e.g., the left side) and a predetermined distance (e.g., 19 pixels) from the top to identify candidate logos, skipping a predetermined distance (e.g., 18 pixels) to the other side (e.g., the right) until reaching the middle of the webpage minus a predetermined amount (e.g., 10 pixels), and then continuing to analyze image elements an additional distance from the top (e.g., 18 pixels) until the images being analyzed are less than a final predetermined distance (e.g., 190 pixels) from the top of the webpage.

When the webpage source code analyzer 130 has identified a logo image element but the webpage does not include a link to an image file corresponding to the image element, e.g., for inline SVG images, the rendered webpage analyzer 140 may use a location and size of the image element in conjunction with a screenshot of the displayed webpage (or simulated display of the webpage) to crop the logo from the screenshot and create a new image file including the logo image.

The rendered webpage analyzer 140 may determine a color included within or surrounding the one or more identified logos. The color may be determined by analyzing the rendered webpage or screenshot of the rendered webpage to find a color value (e.g., a red green blue alpha (RGBA) value) within, adjacent to, or near the logo, for example, next to the upper right corner of the logo. A pixel by pixel analysis of the rendered webpage at a location of the logo or adjacent or near the logo may identify one or more colors that are prominent according to a percent of the analyzed pixels that match to a particular color. For example, any color appearing in 60% or more of the pixels in an analyzed row may be considered to be a prominent color. Both location of colors and their frequency of appearance on the webpage may be considered factors for determining whether the colors are part of the theming or branding of the webpage. In addition, an identification of whether the color is dark or light may help in determining other colors that may be overlaid on the color in a theming or branding of another website or software application. For example, font colors may be determined in the theming or branding of another website or software application according to the background colors determined to be part of the theming or branding of the analyzed website.

When the rendered webpage analyzer 140 extracts the identified logo from the rendered webpage, a background of the region of the rendered webpage corresponding to the logo may be modified by the injected code to modify the background color to a specific single background color rather than a range of different background colors. For example, an original logo may have a gradient background color scheme or many different background colors. The injected code may modify the background of the original logo to a new version of the logo that has a uniform background color that may be an average, median, minimum, or maximum of the original gradient background color scheme.

In addition, or alternatively, to the background image analysis of the webpage source code analyzer 130, the rendered webpage analyzer 140 may identify and analyze any images included in the webpage having a size greater than a threshold, e.g., greater than a width over 420 pixels and/or a height over 247 pixels, and/or located less than a predetermined distance (e.g., 420 pixels) from a top of the webpage. Any identified images may be stored in a list as candidate background images.

In addition, or alternatively, to the prominent colors analysis of the webpage source code analyzer 130, the rendered webpage analyzer 140 may analyze the rendered webpage to identify and create a list of the most common colors used on the webpage. This analysis may be performed after the webpage code is optimized. In the analysis, any colors that are displayed on more than some predetermined percentage (e.g., 59 percent) of a row of the webpage may be considered to be substantial and to be listed as a member of either the foreground or background colors for the webpage. The colors may be identified by a color representation standard, e.g., RGBA. A darkness level may also be associated with each identified color. The colors determined for the foreground-background color pairs may be ranked according to their prevalence on the webpage.

The rendered webpage analyzer 140 may analyze a darkness of prominent and/or dominant background colors or images of the rendered webpage. The rendered webpage analyzer 140 may also analyze a darkness of foreground text colors displayed over the prominent and/or dominant background colors or images of the rendered webpage. The rendered webpage analyzer 140 may generate a map of foreground/background ratios of relative darkness and/or a map of foreground/background colors. The map of foreground/background colors may be coded as a difference between the detected colors and standardized color pairings (e.g., complementary colors of a complementary color wheel). The rendered webpage analyzer 140 may choose a characteristic for the pairing of background color and foreground text color based on a ratio using the darkness ratio map, based on a largest difference between standardized color pairings, or based on a smallest difference between standardized color pairings. For example, the rendered webpage analyzer 140 may choose a characteristic for the pairing of background color and foreground text color based on a smallest or a largest darkness ratio using the darkness ratio map, based on a largest difference between the detected colors and the standardized color pairings using the map of foreground/background colors, or based on a least difference between the detected colors and the standardized color pairings using the map of foreground/background colors.

The rendered webpage analyzer 140 may perform image analysis on the rendered webpage to determine webpage style information, e.g., user interface element styles. For example, the image analysis may determine button styles such as button shapes (e.g., round, rectangular, square, etc.) and sizes. Even though a shape of an image file may always be rectangular, a shape of a user interface element within an image file may vary from image file to image file. Therefore, Image analysis using image analysis algorithms may be used to by the rendered webpage analyzer 140 to determine the webpage style information. As an example, the rendered webpage analyzer 140 may perform a Hough transform on a portion of the rendered webpage including a user interface element, e.g., an image button and/or a button including an image, to determine a shape of the user interface element. In an embodiment, the Hough transform may determine whether an image button and/or a button including an image included in a region of the rendered webpage is circular in shape. Examples of other user interface elements that may involve images and take different shapes include sliders, switches, dials, and knobs.

In operation 212, the analysis controller 150 may cross-correlate and integrate results of the webpage source code analyzer 130 and the rendered webpage analyzer 140 to arrive at one or more values for the identified characteristic of the webpage. For example, the analysis of the rendered webpage by the rendered webpage analyzer 140 may identify background colors, while the analysis of text colors of the webpage by the webpage source code analyzer 130 may map the text colors to locations on the rendered webpage. The analysis controller 150 may use the results of both the webpage source code analyzer 130 and the rendered webpage analyzer 140 to correlate and map the colors and other characteristics of the text that is displayed over the background colors of the webpage. For example, background colors may be mapped to the text colors to determine pairings between font colors and background colors within the webpages theme. In various embodiments, there may be multiple pairings of text font and background colors. The frequency of pairings between font colors and background colors may be determined in order to determine a likely theme or prioritization of themes and subthemes for font color and background color pairings.

In an operation 214, all information collected about the webpage for theming and branding may be stored in transferrable assets (e.g., datafiles) usable by target webpages or software packages to brand and/or theme new webpages or software packages.

In an operation 216, if there are additional characteristics of the same webpage that are desired to be extracted, another characteristic to be extracted from the same webpage may be identified and the process may return to operation 204.

In an operation 218, if there are additional webpages within a same website to be analyzed and have characteristics extracted from, the URL of another webpage within the same website may be identified and the process may return to operation 202 to begin identifying characteristics of the additional identified webpage.

In an operation 220, if multiple webpages within a same website have been analyzed and characteristics extracted from them, the characteristics of each of the webpages may be cross-analyzed and cross-correlated to determine thematic characteristics that span multiple webpages. This information may be collected together and stored as a set of website thematic or branding information for later use in theming or branding other multi-webpage websites or software packages. If only one webpage has been analyzed, then the information of this one webpage may be stored as characteristic for the website overall.

In various embodiments, information pertaining to colors, images, and other branding and theming characteristics on the different webpages according to the analysis performed on numerous webpages within a website may be compared with one another to determine a score or likelihood that the characteristics are part of a theme or brand. For example, an image that only appears on one or a few webpages out of all the webpages on a website may be determined to be unlikely to be a logo, whereas an image that appears on each, a majority, or many of the webpages on the website may be determined to be likely to be a logo. The number of appearances of a candidate logo image across all of the webpages of the website may be a scoring factor, for example. Likewise, background and foreground colors identified on multiple webpages of the website may be determined to be more likely to be part of the theming or branding for the website, whereas background and foreground colors that do not appear on many of the webpages of the website may be determined to be not likely to be part of the theming or branding for the website. As another example, a large image prominently displayed on one webpage but not on other webpages of a website may be determined to be unlikely to be a background image for the theming or branding of the website, although the large image may be determined to be likely to be a background image for the theme of a single webpage if only the webpage on which the large image is displayed was analyzed.

Figure 3:
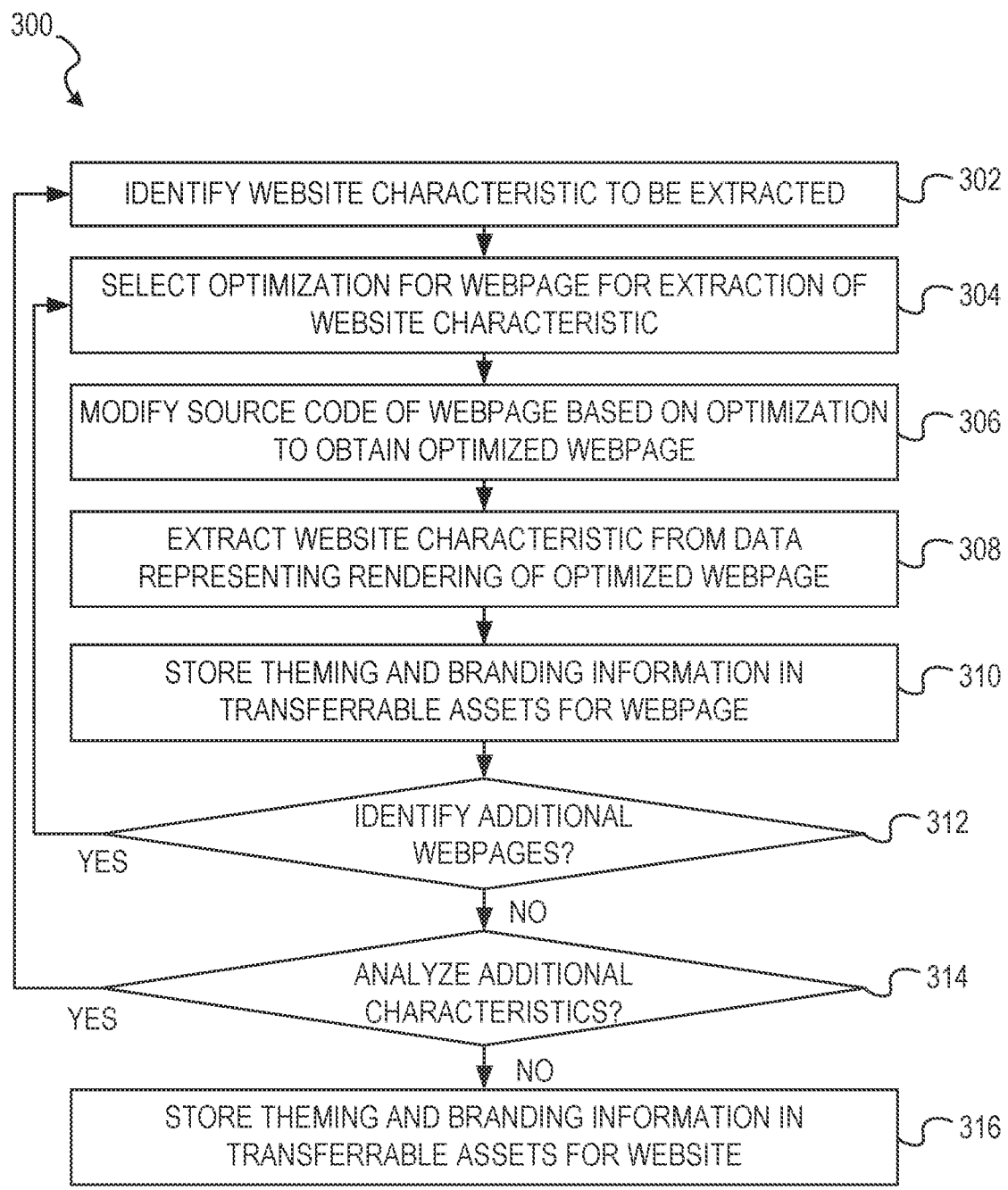
FIG. 3 illustrates an example set of operations for extracting website characteristics in accordance with one or more embodiments.

FIG. 3 illustrates an example set of operations 300 for extracting website characteristics in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments. A detailed example is described below for purposes of clarity. Components and/or operations described below should be understood as one specific example which may not be applicable to certain embodiments. Accordingly, components and/or operations described below should not be construed as limiting the scope of any of the claims.

In various embodiments, a process performed by a system including a computing processor (e.g., the system 100 of FIG. 1) may extract website characteristics from a website or software application, and provide the website characteristics to be applied to a different website or software application. In the following description, embodiments in which the design information is extracted from a website to be applied to a different website or software application is described. However, in various other embodiments, a software application, whether executing on a local client computer system or on a server computer system over a network connection, may be involved and/or operated upon instead of a website. Furthermore, in the embodiments discussed below, focus is given to extracting a logo and colors from a website. Many other theming and branding characteristics (some examples of which are identified with respect to FIG. 2) may be identified and extracted from the website using similar processes.

In an operation 302, the analysis controller 150 may identify a characteristic to be extracted from a website. The identified characteristic may be one that affects the theme or brand of the website. The characteristic may be identified by receiving an identification of the characteristic via a user interface, via a data file, via a communication over a computer communications network, or via another process executing on the computing processor on which the system 100 executes. The website may be identified via a URL and served by web server 110 of FIG. 1. The characteristic to be extracted from the website may include a theme, a logo, branding, a background color, a text color, and/or other examples as discussed above with respect to FIG. 2. The website may be accessed by the web browser 120 via the URL. The web browser 120 may access the website to execute and render one or more webpages hosted by the website.

In an operation 304, the analysis controller 150 may select a webpage and an optimization for the webpage for extraction of a website characteristic. The website may include many webpages, and the webpages may be crawled using a webcrawler algorithm, or the webpages may be selected according to a predetermined set of webpages. The optimization to be performed for each webpage may be selected according to the characteristic to be extracted for the webpage as discussed with respect to operation 206 of FIG. 2.

In an operation 306, the webpage source code analyzer 130 may modify the source code of the webpage based on the selected optimization for the webpage and thereby perform webpage optimization based on the characteristic to be extracted. There may be a different optimized webpage created from a same original webpage for each identified webpage characteristic to be extracted. The webpage source code analyzer 130 may inject new source code, e.g., JavaScript code, into the webpage code executed on the web browser 120. The injected JavaScript code may modify and/or execute alongside the webpage's native code downloaded from the web server 110. The JavaScript code may modify the local copy of the webpage's code in the web browser 120 for optimizing the webpage.

In an operation 308, the webpage source code analyzer 130 and/or the rendered webpage analyzer 140 may extract the identified website characteristic from data representing rendering of the optimized webpage. The rendered webpage analyzer 140 may analyze the webpage rendered by the web browser 120 while the web browser 120 is presently rendering the webpage. Alternatively, or additionally, the rendered webpage analyzer 140 may analyze a stored screenshot of a previously rendered webpage. The extraction of the website characteristic may include analyzing browser-computed values of pixels according to their relative positions within the rendered webpage. The extraction of the website characteristic may include analyzing browser-computed values of objects accessible via the rendered webpage by a user interface element such as a mouse according to webpage source code analyzed within the webpage source code analyzer 130. The rendered webpage analyzer 140 may simulate user interface elements such as a mouse to access the data provided by the web browser 120 when rendering the webpage. Such data may include image data associated with different regions of the rendered webpage, for example.

As an example, an extracted website characteristic may include a ratio of darkness between a dominant background color and a dominant foreground or text color. The rendered webpage analyzer 140 may identify a number of candidate dominant background colors of the rendered webpage, and then analyze a darkness of the candidate dominant background colors of the rendered webpage. The rendered webpage analyzer 140 may also identify a predominant foreground text color displayed over the candidate dominant background colors of the rendered webpage and then analyze a darkness of the predominant foreground text color. The rendered webpage analyzer 140 may compute a darkness ratio for each of the candidate dominant background colors and the predominant foreground text color. The rendered webpage analyzer 140 may choose a characteristic for the pairing of dominant background color and foreground text color based on the darkness ratio. For example, the choice could be based upon the darkness ratio being the largest, or the choice could be based upon the darkness ratio being the smallest.

As an example, an extracted website characteristic may include a pairing of a dominant background color and a dominant foreground text color. The rendered webpage analyzer 140 may identify a number of candidate dominant background colors of the rendered webpage. The rendered webpage analyzer 140 may also identify a number of predominant foreground text colors displayed over the candidate dominant background colors of the rendered webpage. The rendered webpage analyzer 140 may determine a closeness of matching between pairings of the candidate dominant background colors and dominant foreground text colors of the rendered webpage and pairings of colors in a table of complementary colors, e.g., colors of a complementary color wheel. The rendered webpage analyzer 140 may choose a characteristic for the pairing of dominant background color and foreground text color based on the closeness of matching being the best. For example, the choice could be based upon the darkness ratio being the largest, or the choice could be based upon the darkness ratio being the smallest. In some embodiments, a pair of colors from a table of complementary colors that most closely match one of the pairs of candidate background color and foreground text color may be chosen as the characteristic predominant background color and predominant foreground text color for the website characteristic.

In an operation 310, all information collected about the webpage for theming and branding may be stored in transferrable assets (e.g., datafiles) usable by target webpages or software packages to brand and/or theme new webpages or software packages.

In an operation 312, if there are additional webpages within a same website to be analyzed and have a same characteristic extracted from, the URL of another webpage within the same website may be identified and the process may return to operation 304 for the additional identified webpage.

In an operation 314, if there are additional characteristics of the same website that are desired to be extracted, another characteristic to be extracted from the same website may be identified and the process may return to operation 302.

In an operation 316, if multiple webpages within a same website have been analyzed and characteristics extracted from them, the characteristics of each of the webpages may be cross-analyzed and cross-correlated to determine thematic characteristics that span multiple webpages. This information may be collected together and stored as a set of website thematic or branding information for later use in theming or branding other multi-webpage websites or software packages. If only one webpage has been analyzed, then the information of this one webpage may be stored as characteristic for the website overall.

Figure 4:
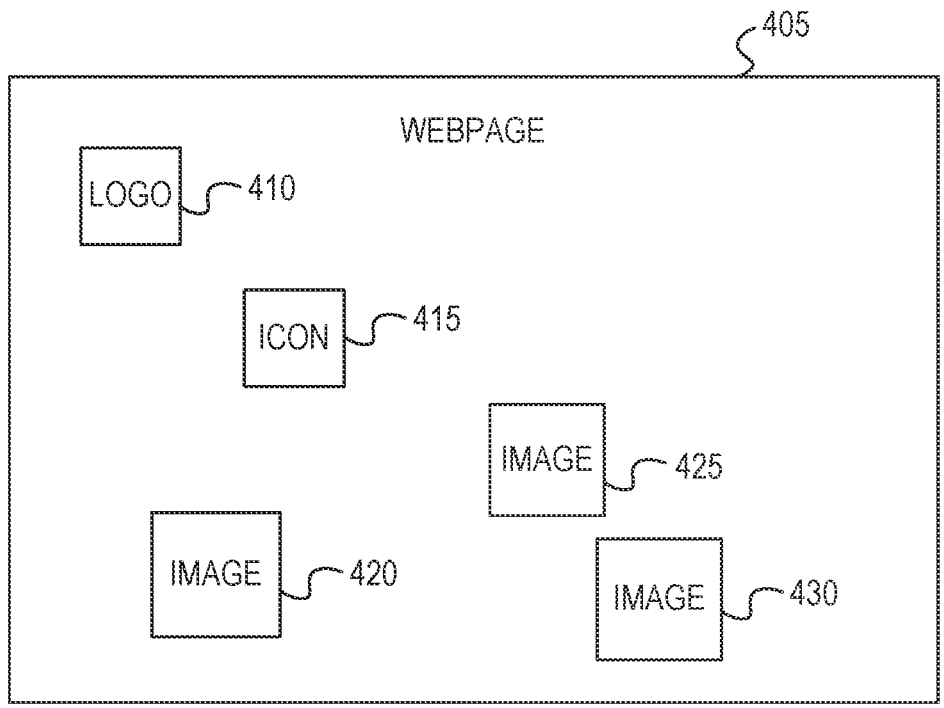
FIG. 4 illustrates an exemplary embodiment of a webpage including characteristics to be extracted in accordance with one or more embodiments.

FIG. 4 illustrates an exemplary embodiment of a webpage 405 including characteristics to be extracted in accordance with one or more embodiments. The characteristics may be extracted according to any of the operations discussed above in relation to FIGS. 2 and 3, and combinations or variations thereof. An example of extracting one of more characteristics of the webpage 405 is discussed below.

The webpage 405 includes a logo 410, an icon 415, and images 420, 425, and 430. In various embodiments, the webpage 405 may include any number of different logos, icons, and images located in different locations on the webpage. The analysis controller 150 may select a characteristic of a website that includes the webpage 405 to extract from the webpage 405. When the selected characteristic is a logo, the webpage source code analyzer 130 and/or rendered webpage analyzer 140 may identify data including a logo 410, an icon 415, and images 420, 425, and 430 as representing a rendering of the webpage 405. The webpage source code analyzer 130 and/or rendered webpage analyzer 140 may analyze each of the logo 410, icon 415, and images 420, 425, and 430 to perform a scoring and identify which is most likely to be the logo of the webpage 405 according to which has a highest score. When there is a tie, the largest image may be preferred, or the image closest to the upper left may be preferred.

In various embodiments, any of the logo 410, icon 415, and images 420, 425, and 430 may be downloadable from a network location identified by a URL for easy access represented in the webpage 405 as an inline image file, e.g., scalable vector graphics (SVG) file. When analyzed by the rendered webpage analyzer 140 alone, any of the logo 410, icon 415, and images 420, 425, and 430 may potentially be considered logos. For example, they each may include shapes and be of sizes that are typical of logos. However, various other scoring factors may be taken into consideration as discussed elsewhere herein, including factors identified by the webpage source code analyzer 130, to generate the highest score for the logo 410 and identify the logo 410 as the webpage logo. Some of the factors that may generate a high score for the logo 410 may include the following:

- the logo 410 is placed high and toward the left of the webpage 405
- the size of the logo 410 is within an expected range of sizes for a logo within a webpage
- the logo 410 does not include typical disqualifications for logos such as social media badges
- some of the logo 410's webpage cascading style sheets (CSS) class attributes include the word "logo"

Once the analysis controller 150 has identified the logo 410 as the logo of the webpage 405, the analysis controller 150 may control the webpage source code analyzer 130 to inject code, e.g., JavaScript code, into the webpage 405 to extract the logo 410 from the webpage 405.

The analysis controller 150 may also continue to perform analysis and characteristic extraction of the webpage 405 based on other characteristics. For example, the analysis controller 150 may control the webpage source code analyzer 130 to inject code, e.g., JavaScript code, into the webpage 405 to modify the colors of the webpage 405 surrounding the logo 410 to unify the colors. The analysis controller 150 may then control the webpage source code analyzer 130 and the rendered webpage analyzer 140 to identify, download, and analyze the other images of the icon 415, and images 420, 425, and 430. The analysis controller 150 may determine the dominant background color, the dominant foreground text color, and a pairing of foreground text/background colors.

The analysis controller 150 may also choose a main image as a background image or a dominant color as a background. A text font, text size, button style, etc. may also be determined. Once all the branding and theming information has been determined from the webpage 405, the branding and theming information may be stored for use in branding or theming a white label website or software application to appear branded or themed in a manner similar to that of the webpage 405.

4. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
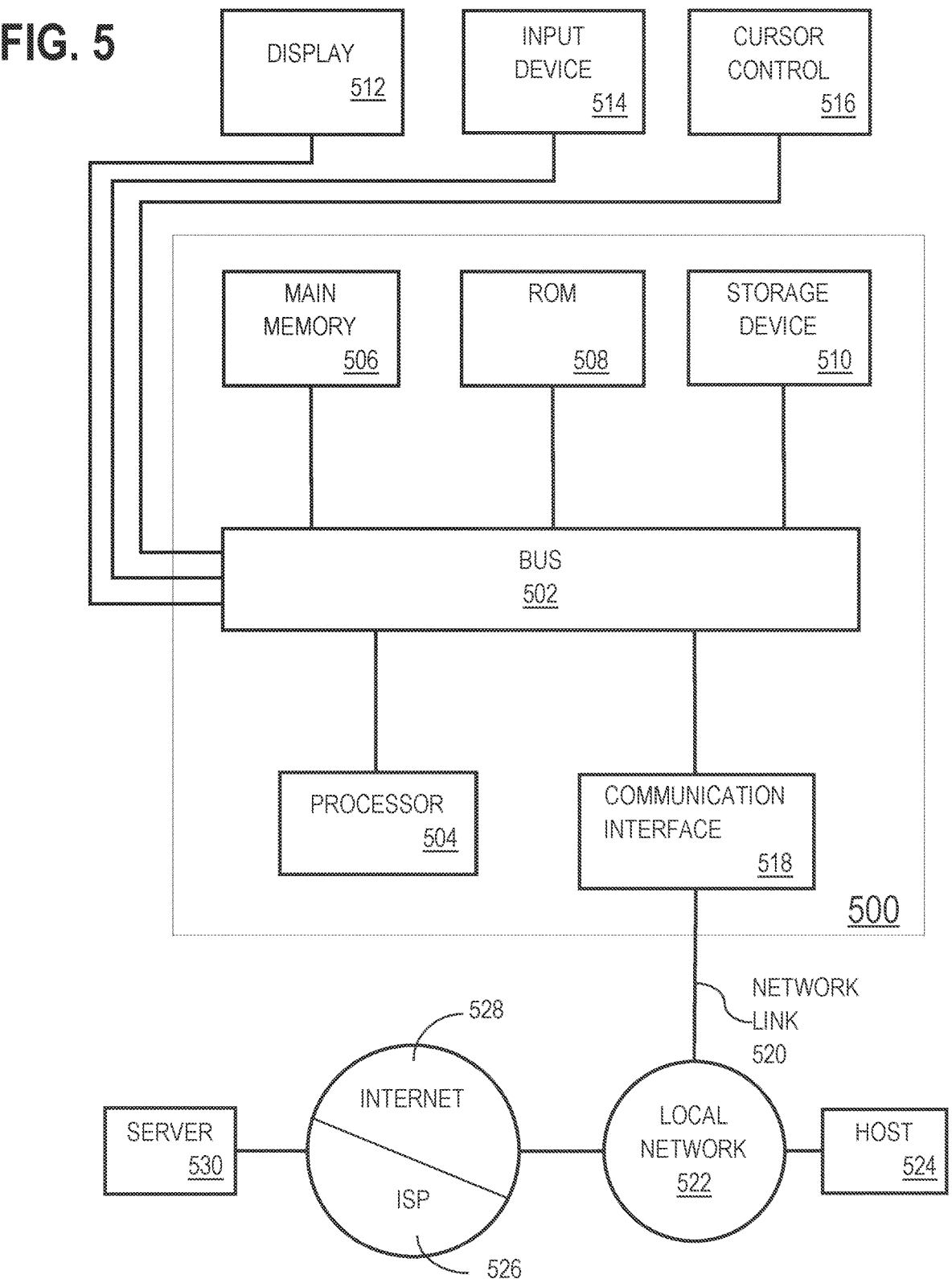
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into the remote computer's dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as the code is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions, which when executed by one or more hardware processors, cause performance of operations comprising:
   identifying a plurality of webpages within a website;
   identifying a first thematic characteristic detected on the plurality of webpages based at least on determining that a first number of webpages on which a first website characteristic is detected is two or more;
   identifying the first thematic characteristic as a logo at least by performing operations comprising:
      identifying a plurality of images among the plurality of webpages;
      comparing a first size of a first image among the plurality of images to a threshold;
      based on determining the first size of the first image exceeds the threshold: selecting the first image as a candidate for the logo;
      comparing a second size of a second image among the plurality of images to the threshold;
      based on determining the second size of the second image does not exceed the threshold: rejecting the second image as a candidate for the logo; and based on selecting the first image as the candidate for the logo and rejecting the second image as the candidate for the logo: identifying the first image as the logo.

2. The one or more non-transitory computer-readable media of claim 1, wherein the operations further comprise:
based at least on the first number of web pages on which the first website characteristic is detected:
classifying the first website characteristic as the first thematic characteristic for the website; and
storing the first website characteristic in a set of website thematic information for the website;
identifying a second website characteristic detected on a second number of webpages of the plurality of webpages, the second number being one or more; and
based at least on the second number of web pages on which the second website characteristic is detected:
determining that the second website characteristic is not a thematic characteristic for the website; and
refraining from storing the second website characteristic in the set of website thematic information for the website.

3. The media of claim 2, wherein classifying the first website characteristic comprises classifying the first website characteristic based further on a total number of appearances of the first website characteristic across the plurality of webpages.

4. The media of claim 2, wherein classifying the first website characteristic comprises:
based on detecting the first website characteristic on the first number of webpages, computing a score representing a likelihood that the first website characteristic is the first thematic characteristic of the website; and
classifying the first website characteristic as the first thematic characteristic for the website based further on the score.

5. The media of claim 2, wherein identifying the first website characteristic detected on two or more webpages of the plurality of webpages further comprises cross-analyzing the two or more webpages of the plurality of webpages.

6. The media of claim 2, further comprising:
extracting the set of website thematic information for the website; and
storing the set in a transferable data file.

7. The non-transitory computer-readable media of claim 2, wherein the operations further comprise:
identifying the first website characteristic and the second website characteristic for extraction from the plurality of webpages; and
responsive to identifying the first website characteristic and the second website characteristic for extraction from the plurality of webpages: modifying the plurality of webpages based on the first website characteristic and the second website characteristic to generate a first plurality of modified webpages corresponding to the first website characteristic and the plurality of webpages and a second plurality of modified webpages corresponding to the second website characteristic and the plurality of webpages, and
wherein identifying the first website characteristic detected on the first number of webpages comprises: identifying the first website characteristic detected on a first number of modified webpages generated based on the plurality of webpages.

8. The non-transitory computer-readable media of claim 7, wherein modifying the plurality of webpages based on the first website characteristic and the second website characteristic to generate a plurality of modified webpages comprises:
modifying source code of the plurality of webpages to generate a first plurality of modified webpages corresponding to the first website characteristic and a second plurality of modified webpages corresponding to the second website characteristic, and
wherein identifying the first website characteristic detected on the first number of webpages of the plurality of modified webpages comprises identifying the first website characteristic detected on the first number of webpages among the first plurality of modified webpages.

9. The non-transitory computer-readable media of claim 7, wherein modifying the plurality of webpages based on the first website characteristic and the second website characteristic to generate a plurality of modified webpages comprises:
modifying, in source code, an opacity of a third website characteristic, which is different from the first website characteristic.

10. The non-transitory computer-readable media of claim 7, wherein modifying the plurality of webpages based on the first website characteristic and the second website characteristic to generate a plurality of modified webpages comprises:
modifying source code for the plurality of webpages based on the first website characteristic and the second website characteristic; and
rendering the plurality of modified webpages based on modifying the source code.

11. The non-transitory computer-readable of claim 2, wherein the operations further comprise:
identifying a second thematic characteristic detected on the plurality of webpages based at least on determining a third number of webpages on which a third website characteristic is detected; and
based at least on the third number of web pages on which the third website characteristic is detected:
classifying the third website characteristics as the second thematic characteristic,
wherein identifying the third website characteristic detected on the third number of webpages of the plurality of webpages comprises analyzing source code to identify a text color and one or more background colors on the third number of webpages, and
wherein classifying the third website characteristic as the third thematic characteristic comprises classifying a pair including the text color and the one or more background colors as the third thematic characteristic for the website.

12. The non-transitory computer-readable of claim 2, wherein the operations further comprise:
identifying the logo for extraction from the plurality of webpages; and
responsive to identifying the logo for extraction from the plurality of webpages: modifying a background color in a background region of a rendered webpage corresponding to the logo from including a plurality of background colors to including a single background color.

13. The non-transitory computer-readable of claim 2, wherein the operations further comprise:
identifying a second thematic characteristic detected on the plurality of webpages based at least on determining a third number of webpages on which a third website characteristic is detected; and based at least on the third number of web pages on which the third website characteristic is detected:

classifying the third website characteristics as the second thematic characteristic, wherein the third website characteristic is a pairing of colors among the plurality of webpages, and wherein classifying the third website characteristic as the second thematic characteristic comprises classifying a color pair as the second thematic characteristic based on a frequency with which the color pair is identified among the plurality of webpages.

14. The non-transitory computer-readable of claim 13, wherein the color pair comprises a font color and a background color.

15. A method comprising:

identifying a plurality of webpages within a website;

identifying a first website characteristic detected on a first number of webpages of the plurality of webpages, the first number being two or more;

based on determining the first website characteristic is detected on the first number of webpages of the plurality of webpages:

classifying the first website characteristic as a thematic characteristic for the website; and storing the first website characteristic in a set of website thematic information for the website;

identifying a second website characteristic detected on a second number of webpages of the plurality of webpages, the second number being one or more; and based on determining the second website characteristic is detected on the second number of webpages of the plurality of webpages:

determining that the second website characteristic is not a thematic characteristic for the website; and refraining from storing the second website characteristic in the set of website thematic information for the website;

identifying the thematic characteristic as a logo at least by performing operations comprising:

identifying a plurality of images among the plurality of webpages;

comparing a first size of a first image among the plurality of images to a threshold;

based on determining the first size of the first image exceeds the threshold: selecting the first image as a candidate for the logo;

comparing a second size of a second image among the plurality of images to the threshold;

based on determining the second size of the second image does not exceed the threshold: rejecting the second image as a candidate for the logo;

based on selecting the first image as the candidate for the logo and rejecting the second image as the candidate for the logo: identifying the first image as the logo.

16. The method of claim 15, wherein classifying the first website characteristic comprises classifying the first website characteristic based on a total number of appearances of the first website characteristic across the plurality of webpages.

17. The method of claim 15, wherein classifying the first website characteristic comprises:

based on detecting the first website characteristic on the first number of webpages, computing a score representing a likelihood that the first website characteristic is the thematic characteristic of the website; and classifying the first website characteristic as the thematic characteristic for the website based on the score.

18. The method of claim 15, wherein identifying the first website characteristic detected on two or more webpages of the plurality of webpages further comprises cross-analyzing the two or more webpages of the plurality of webpages.

19. The method of claim 15, further comprising:

extracting the set of website thematic information for the website; and storing the set in a transferable data file.

20. A system comprising:

at least one device including a hardware processor;

the system being configured to perform operations comprising:

identifying a plurality of webpages within a website;

identifying a first website characteristic detected on a first number of webpages of the plurality of webpages, the first number being two or more;

based on determining the first website characteristic is detected on the first number of webpages of the plurality of webpages:

classifying the first website characteristic as a thematic characteristic for the website; and storing the first website characteristic in a set of website thematic information for the website;

identifying a second website characteristic detected on a second number of webpages of the plurality of webpages, the second number being one or more; and based on determining the second website characteristic is detected on the second number of webpages of the plurality of webpages:

determining that the second website characteristic is not a thematic characteristic for the website; and refraining from storing the second website characteristic in the set of website thematic information for the website;

identifying the thematic characteristic as a logo at least by performing operations comprising:

identifying a plurality of images among the plurality of webpages;

comparing a first size of a first image among the plurality of images to a threshold;

based on determining the first size of the first image exceeds the threshold: selecting the first image as a candidate for the logo;

comparing a second size of a second image among the plurality of images to the threshold;

based on determining the second size of the second image does not exceed the threshold: rejecting the second image as a candidate for the logo;

based on selecting the first image as the candidate for the logo and rejecting the second image as the candidate for the logo: identifying the first image as the logo.

21. The system of claim 20, wherein classifying the first website characteristic comprises classifying the first website characteristic based on a total number of appearances of the first website characteristic across the plurality of webpages.

22. The system of claim 20, wherein classifying the first website characteristic comprises:

based on detecting the first website characteristic on the first number of webpages, computing a score representing a likelihood that the first website characteristic is the thematic characteristic of the website; and classifying the first website characteristic as the thematic characteristic for the website based on the score.

23. The system of claim 20, wherein identifying the first website characteristic detected on two or more webpages of the plurality of webpages further comprises cross-analyzing the two or more webpages of the plurality of webpages.

24. The non-transitory computer-readable of claim 1, wherein the operations further comprise:
- generating a score for each image of the plurality of images based on a set of factors, the set of factors including a size of the image,
- wherein the set of factors further includes at least one of:
  - a presence of a word "logo" in a field or element attribute associated with an image;
  - a presence of a link to a host different from a particular webpage in source code corresponding to the image in the particular webpage; and
  - a distance of the image from an edge of the particular webpage;
  and
- identifying a particular image among the plurality of images as the logo based on a particular score for the particular image.

* * * * *

UNITED STATES PATENT AND TRADEMARK OFFICE
CERTIFICATE OF CORRECTION

PATENT NO. : 12,073,171 B2
APPLICATION NO. : 17/205166
DATED : August 27, 2024
INVENTOR(S) : Orciuoli et al.

Page 1 of 1

It is certified that error appears in the above-identified patent and that said Letters Patent is hereby corrected as shown below:

In the Specification

In Column 1, Line 10, delete "28," and insert -- 29, --, therefor.

Signed and Sealed this
Seventh Day of January, 2025

Derrick Brent
*Acting Director of the United States Patent and Trademark Office*